(12) United States Patent
Okamoto et al.

(10) Patent No.: US 11,807,825 B2
(45) Date of Patent: Nov. 7, 2023

(54) LUBRICANT COMPOSITION AND BEARING HAVING THE SAME SEALED THEREIN

(71) Applicants: NIPPON THOMPSON CO., LTD., Tokyo (JP); Ushio Chemix Corporation, Shizuoka (JP)

(72) Inventors: Kazuo Okamoto, Shizuoka (JP); Hiroyuki Otsuki, Shizuoka (JP); Shigemasa Itabashi, Kanagawa (JP); Ayana Takemura, Kanagawa (JP)

(73) Assignees: NIPPON THOMPSON CO., LTD., Tokyo (JP); Ushio Chemix Corporation, Shizuoka (JP)

( * ) Notice: Subject to any disclaimer, the term of this patent is extended or adjusted under 35 U.S.C. 154(b) by 0 days.

(21) Appl. No.: 17/761,917

(22) PCT Filed: Aug. 11, 2020

(86) PCT No.: PCT/JP2020/030583
§ 371 (c)(1),
(2) Date: Mar. 18, 2022

(87) PCT Pub. No.: WO2021/054000
PCT Pub. Date: Mar. 25, 2021

(65) Prior Publication Data
US 2022/0364009 A1  Nov. 17, 2022

(30) Foreign Application Priority Data
Sep. 19, 2019  (JP) .................................. 2019-170659

(51) Int. Cl.
*C10M 105/18*  (2006.01)
*C10M 125/18*  (2006.01)
(Continued)

(52) U.S. Cl.
CPC ........ *C10M 105/18* (2013.01); *C10M 125/18* (2013.01); *C10M 2201/081* (2013.01);
(Continued)

(58) Field of Classification Search
CPC .............. C10M 105/18; C10M 125/18; C10M 2201/081; C10M 2207/04;
(Continued)

(56) References Cited

U.S. PATENT DOCUMENTS 5,403,960 A     4/1995  Kadkhodayan et al.
5,569,404 A  *  10/1996  Francisco ............ C10M 125/18
                                                                508/547
(Continued)

FOREIGN PATENT DOCUMENTS

CN     102807913 A    12/2012
GB       1575957 A    10/1980
(Continued)

OTHER PUBLICATIONS

Office Action issued in corresponding Chinese Patent Application No. 202080065733.7 dated Sep. 5, 2022 (8 pages).
(Continued)

*Primary Examiner* — James C Goloboy
(74) *Attorney, Agent, or Firm* — Osha Bergman Watanabe & Burton LLP

(57) ABSTRACT

Provided are a lubricant composition which is advantageous in that, when applied to a contact area of metal parts, the lubricant composition can suppress generation of rust and can exhibit excellent lubricating performance, and a bearing the lubricant composition having sealed therein. A lubricant composition comprising at least one dicyclic liquid crystal compound represented by the following formula (1), at least one tricyclic liquid crystal compound represented by the
(Continued)

following formula (2), and halogen ions, wherein the content of the halogen ions in the lubricant composition is 1 to 900 ppm.

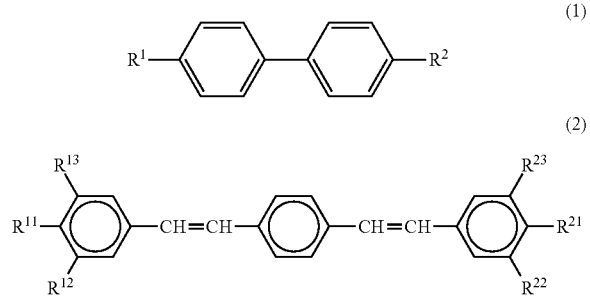

8 Claims, 2 Drawing Sheets

(51) Int. Cl.
C10N 30/00 (2006.01)
C10N 20/00 (2006.01)
C10N 30/06 (2006.01)
C10N 30/12 (2006.01)
C10N 40/02 (2006.01)

(52) U.S. Cl.
CPC . C10M 2207/04 (2013.01); C10N 2207/0406 (2013.01); C10N 2020/079 (2020.05); C10N 2030/06 (2013.01); C10N 2030/12 (2013.01); C10N 2030/41 (2020.05); C10N 2040/02 (2013.01)

(58) Field of Classification Search
CPC ..... C10M 2207/0406; C10N 2020/079; C10N 2030/06; C10N 2030/12; C10N 2030/41; C10N 2040/02
See application file for complete search history.

(56) References Cited

U.S. PATENT DOCUMENTS 5,652,201 A * 7/1997 Papay .................. C10M 159/12
508/228
5,958,848 A 9/1999 Robson

FOREIGN PATENT DOCUMENTS

| JP | S4625210 B1 | 7/1971 |
| JP | S52130804 A | 11/1977 |
| JP | S63235399 A | 9/1988 |
| JP | H5213856 A | 8/1993 |
| JP | H11512758 A | 11/1999 |
| JP | 2002129179 A | 5/2002 |
| JP | 2004359848 A | 12/2004 |
| JP | 2006182927 A | 7/2006 |
| JP | 2015199934 A | 11/2015 |
| JP | 2016130316 A | 7/2016 |
| JP | 2016150954 A | 8/2016 |
| JP | 2017105874 A | 6/2017 |
| JP | 2017105874 A * | 6/2017 |
| JP | 2019112495 A | 7/2019 |
| JP | 2020012034 A | 1/2020 |

OTHER PUBLICATIONS

Ikemoto, Yuji, "Action Mechanism of Extreme Pressure Additives," vol. 6, No. 11, pp. 794-806, 1971 (18 pages) with Partial English Translation.
Naganuma, Toshio, Lubricants, vol. 15, No. 6, pp. 345-351, 1970 (10 pages) with Partial English Translation.
International Search Report issued in corresponding International Application No. PCT/JP2020/030583; dated Oct. 13, 2020 (3 pages).
Written Opinion of the International Searching Authority issued in corresponding International Application No. PCT/JP2020/030583; dated Oct. 13, 2020 (4 pages).

* cited by examiner

LUBRICANT COMPOSITION AND BEARING HAVING THE SAME SEALED THEREIN

The present application is a national stage of PCT Application No. PCT/JP2020/030583 filed on Aug. 11, 2020 and claims priority to Japanese Patent Application No. 2019-170659 filed on Sep. 19, 2019.

FIELD OF THE INVENTION

The present invention relates to a lubricant composition and a bearing having the same sealed therein.

BACKGROUND ART

A lubricant is generally a material which is applied to moving areas of a machine to reduce friction of the parts that are in contact with each other, preventing generation of frictional heat and suppressing a stress focused on a contact area of parts. Further, the lubricant is also a material which effectively acts for, for example, sealing, rust prevention, and dust-proofness. The lubricant contains a lubricating oil and a grease. The lubricating oil is generally a mixed oil, such as a refined petroleum material. On the other hand, the grease has the lubricating oil kept in a thickener to impart thixotropic properties for the purpose of applying the lubricant to a sliding surface that is unlikely to remain in a state of having a lubricant film deposited on the surface (for example, a slide bearing or a rolling bearing).

The lubricant is required to have not only a low coefficient of friction but also various properties, such as a wide range of temperatures during which the lubricant can be used, and a small loss due to, for example, evaporation or decomposition for a long term.

Patent document 1 has a description of a lubricant for a bearing, having a liquid crystal compound and a grease mixed with each other. Patent documents 2 to 5 have a description that, by using a specific liquid crystal compound, it is possible to produce a lubricant which is effective in a wide range of temperatures and unlikely to evaporate for a long term. Patent document 5 has a description of a heat-resistant conductive lubricant comprising a liquid crystal mixture having a dicyclic liquid crystal compound and a tricyclic liquid crystal compound mixed with each other. In this parent document, there is a description that when the dicyclic liquid crystal compound and the tricyclic liquid crystal compound are mixed in a 1:1 ratio, a lubricant which exhibits liquid crystal properties in the range of from −50 to +220° C. can be produced.

PRIOR ART REFERENCES

Patent Documents

Patent document 1: Japanese Unexamined Patent Publication No. 2004-359848
Patent document 2: Japanese Unexamined Patent Publication No. 2015-199934
Patent document 3: Japanese Unexamined Patent Publication No. 2016-130316
Patent document 4: Japanese Unexamined Patent Publication No. 2016-150954
Patent document 5: Japanese Unexamined Patent Publication No. 2017-105874

SUMMARY OF THE INVENTION

Problems to be Solved by the Invention

An object of the present invention is to provide a lubricant composition which is advantageous in that, when applied to a contact area of metal parts, the lubricant composition can suppress generation of rust and can exhibit excellent lubricating performance, and a bearing having the lubricant composition sealed therein.

Means for Solving the Problems

The present inventors have found that, by mixing a dicyclic liquid crystal compound and a tricyclic liquid crystal compound having specific structures, a liquid crystal mixture which can exhibit excellent performance as a lubricant can be obtained, and the present invention has been completed. Further, they have found that when the content of halogen ions in the liquid crystal mixture is controlled to be in a specific range, there can be obtained a lubricant composition which can suppress generation of rust and can exhibit excellent lubricating performance, and thus the present invention has been completed. Specifically, the present invention encompasses the followings.

[1]
A lubricant composition comprising at least one dicyclic liquid crystal compound represented by the following formula (1), at least one tricyclic liquid crystal compound represented by the following formula (2), and halogen ions, wherein the content of the halogen ions in the lubricant composition is 1 to 900 ppm:

Formula (1):

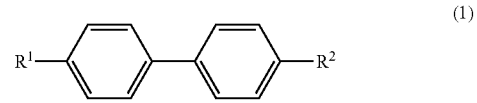

wherein $R^1$ and $R^2$ are the same or different, and are a group: —OCH$_2$CH$_2$CH(R')CH$_2$CH$_2$OR (wherein R is linear or branched $C_nH_{2n+1}$ wherein the relationship: $1 \leq n \leq 20$ is satisfied, and R' is methyl or ethyl), Formula (2):

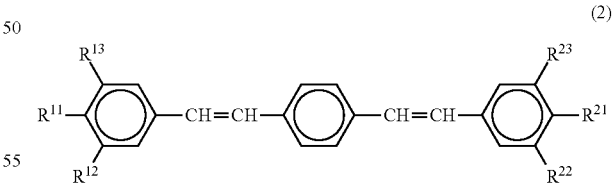

wherein $R^{11}$ and $R^{21}$ are the same or different, and are a group: —OR or a group: —OCH$_2$CH$_2$CH(R') CH$_2$CH$_2$OR (wherein R is linear or branched $C_nH_{2n+1}$ wherein the relationship: $1 \leq n \leq 20$ is satisfied, and R' is methyl or ethyl), and
$R^{12}$, $R^{13}$, $R^{22}$, and $R^{23}$ are the same or different, and are hydrogen, a group: —OR, or a group: —OCH$_2$CH$_2$CH (R')CH$_2$CH$_2$OR (wherein R is linear or branched $C_nH_{2n+1}$ wherein the relationship: $1 \leq n \leq 20$ is satisfied, and R' is methyl or ethyl).

[2]
The lubricant composition according to item [1] above, wherein the halogen ions are chloride ions.

[3]
The lubricant composition according to item [1] or [2] above, wherein the tricyclic liquid crystal compound is at least one member of compounds represented by the following formulae (3) to (7):

(3)

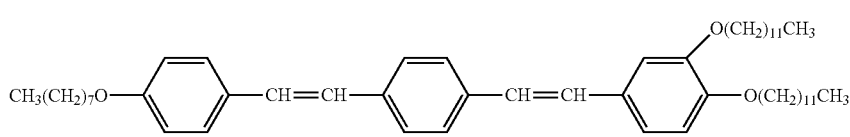

(4)

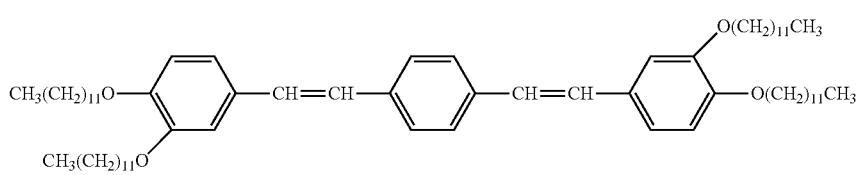

(5)

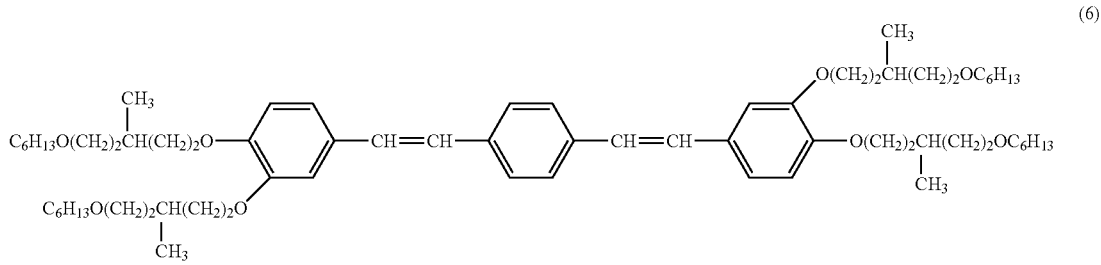

(6)

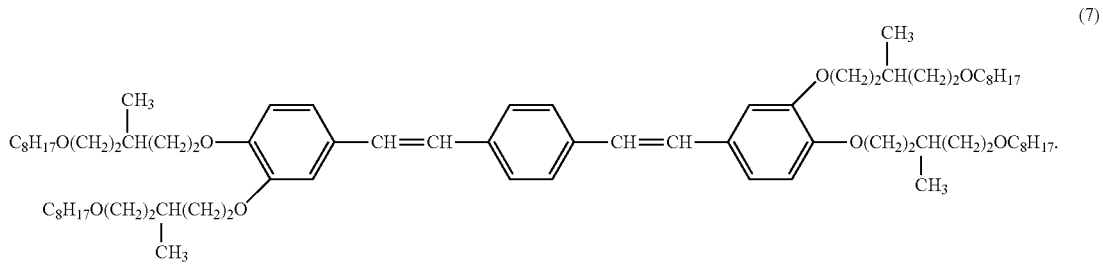

(7)

A bearing having sealed therein the lubricant composition according to any one of items [1] to [3] above.

Effects of the Invention

By the present invention, there can be provided a lubricant composition which is advantageous in that, when applied to a contact area of metal parts, the lubricant composition can suppress generation of rust and can exhibit excellent lubricating performance, and a bearing having the lubricant composition sealed therein.

MODE FOR CARRYING OUT THE INVENTION

Figure 1:
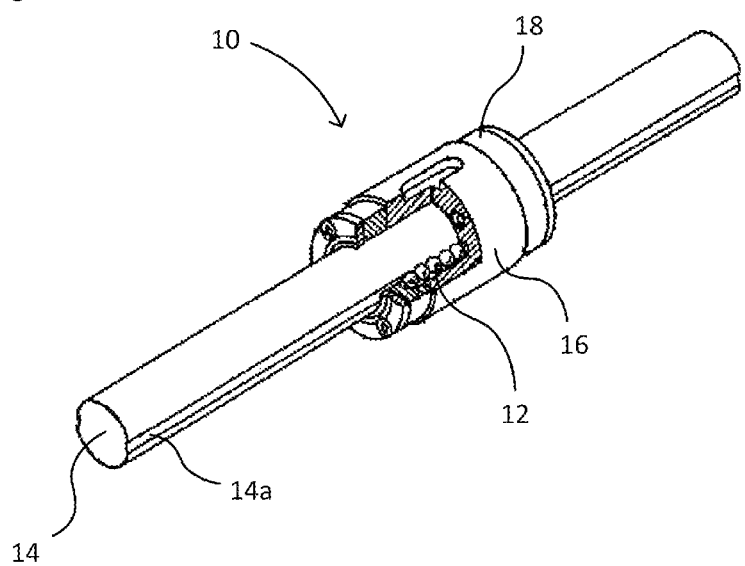
FIG. 1 A perspective view of a bearing.

Herein below, an embodiment of the present invention will be described in detail.

According to the present embodiment, there is provided a lubricant composition comprising at least one dicyclic liquid crystal compound represented by the formula (1) below, at least one tricyclic liquid crystal compound represented by the formula (2) below, and halogen ions, wherein the content of the halogen ions in the lubricant composition is 1 to 900 ppm:

Formula (1):

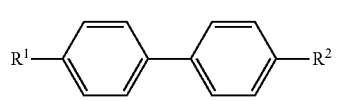

(1)

wherein $R^1$ and $R^2$ are the same or different, and are a group: —OCH$_2$CH$_2$CH(R')CH$_2$CH$_2$OR (wherein R is linear or branched $C_nH_{2n+1}$ wherein the relationship: $1 \leq n \leq 20$ is satisfied, and R' is methyl or ethyl), Formula (2):

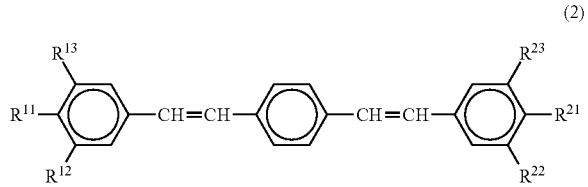

(2)

wherein $R^{11}$ and $R^{21}$ are the same or different, and are a group: —OR or a group: —OCH$_2$CH$_2$CH(R')CH$_2$CH$_2$OR (wherein R is linear or branched C$_n$H$_{2n+1}$ wherein the relationship: $1 \leq n \leq 20$ is satisfied, and R' is methyl or ethyl), and $R^{12}$, $R^{13}$, $R^{22}$, and $R^{23}$ are the same or different, and are hydrogen, a group: —OR, or a group: —OCH$_2$CH$_2$CH(R')CH$_2$CH$_2$OR (wherein R is linear or branched C$_n$H$_{2n+1}$ wherein the relationship: $1 \leq n \leq 20$ is satisfied, and R' is methyl or ethyl).

In the formulae (1) and (2), $R^1$, $R^2$, $R^{11}$, $R^{12}$, $R^{13}$, $R^{21}$, $R^{22}$, and $R^{23}$ are a chain group that is linked to the core structure and contributes to lubricating properties of the molecule. By appropriately selecting $R^1$, $R^2$, $R^{11}$, $R^{12}$, $R^{13}$, $R^{21}$, $R^{22}$, and $R^{23}$, the size (longer diameter) of the whole molecule and the polarity can be controlled.

Examples of R's in the formulae (1) and (2) include a n-butyl group, an isobutyl group, a sec-butyl group, a tert-butyl group, a n-pentyl group, a 1-methyl-n-butyl group, a 2-methyl-n-butyl group, a 3-methyl-n-butyl group, a 1,1-dimethyl-n-propyl group, a 1,2-dimethyl-n-propyl group, a 2,2-dimethyl-n-propyl group, a 1-ethyl-n-propyl group, a n-hexyl group, a 1-methyl-n-pentyl group, a 2-methyl-n-pentyl group, a 3-methyl-n-pentyl group, a 4-methyl-n-pentyl group, a 1,1-dimethyl-n-butyl group, a 1,2-dimethyl-n-butyl group, a 1,3-dimethyl-n-butyl group, a 2,2-dimethyl-n-butyl group, a 2,3-dimethyl-n-butyl group, a 3,3-dimethyl-n-butyl group, a 1-ethyl-n-butyl group, a 2-ethyl-n-butyl group, a 1,1,2-trimethyl-n-propyl group, a 1,2,2-trimethyl-n-propyl group, a 1-ethyl-1-methyl-n-propyl group, a 1-ethyl-2-methyl-n-propyl group, a n-heptyl group, a 1-methyl-n-hexyl group, a 2-methyl-n-hexyl group, a 3-methyl-n-hexyl group, a 1,1-dimethyl-n-pentyl group, a 1,2-dimethyl-n-pentyl group, a 1,3-dimethyl-n-pentyl group, a 2,2-dimethyl-n-pentyl group, a 2,3-dimethyl-n-pentyl group, a 3,3-dimethyl-n-pentyl group, a 1-ethyl-n-pentyl group, a 2-ethyl-n-pentyl group, a 3-ethyl-n-pentyl group, a 1-methyl-1-ethyl-n-butyl group, a 1-methyl-2-ethyl-n-butyl group, a 1-ethyl-2-methyl-n-butyl group, a 2-methyl-2-ethyl-n-butyl group, a 2-ethyl-3-methyl-n-butyl group, a n-octyl group, a 1-methyl-n-heptyl group, a 2-methyl-n-heptyl group, a 3-methyl-n-heptyl group, a 1,1-dimethyl-n-hexyl group, a 1,2-dimethyl-n-hexyl group, a 1,3-dimethyl-n-hexyl group, a 2,2-dimethyl-n-hexyl group, a 2,3-dimethyl-n-hexyl group, a 3,3-dimethyl-n-hexyl group, a 1-ethyl-n-hexyl group, a 2-ethyl-n-hexyl group, a 3-ethyl-n-hexyl group, a 1-methyl-1-ethyl-n-pentyl group, a 1-methyl-2-ethyl-n-pentyl group, a 1-methyl-3-ethyl-n-pentyl group, a 2-methyl-2-ethyl-n-pentyl group, a 2-methyl-3-ethyl-n-pentyl group, a 3-methyl-3-ethyl-n-pentyl group, a n-nonyl group, a n-decyl group, a n-undecyl group, and a n-dodecyl group.

In the formula (1), $R^1$ and $R^2$ are the same or different, and are a group: —OCH$_2$CH$_2$CH(R')CH$_2$CH$_2$OR (wherein R is linear or branched C$_n$H$_{2n+1}$ wherein the relationship: $1 \leq n \leq 20$ is satisfied, preferably the relationship: $1 \leq n \leq 15$, more preferably the relationship: $4 \leq n \leq 12$, especially preferably the relationship: $8 \leq n \leq 10$ is satisfied, and R' is methyl or ethyl).

In the formula (1), it is preferred that the relationship: $1 \leq n \leq 15$ is satisfied, and R' is methyl.

In the formula (2), $R^{11}$ and $R^{21}$ are the same or different, and are a group: —OR or a group: —OCH$_2$CH$_2$CH(R')CH$_2$CH$_2$OR (wherein R is linear or branched C$_n$H$_{2n+1}$ wherein the relationship: $1 \leq n \leq 20$ is satisfied, preferably the relationship: $4 \leq n \leq 16$, more preferably the relationship: $6 \leq n \leq 12$ is satisfied, and R' is methyl or ethyl).

In the formula (2), $R^{12}$, $R^{13}$, $R^{22}$, and $R^{23}$ are the same or different, and are hydrogen, a group: —OR, or a group: —OCH$_2$CH$_2$CH(R')CH$_2$CH$_2$OR (wherein R is linear or branched C$_n$H$_{2n+1}$ wherein the relationship: $1 \leq n \leq 20$ is satisfied, preferably the relationship: $4 \leq n \leq 16$, more preferably the relationship: $6 \leq n \leq 12$ is satisfied, and R' is methyl or ethyl).

It is preferred that the tricyclic liquid crystal compound represented by the formula (2) is at least one member of compounds represented by the following formulae (3) to (7).

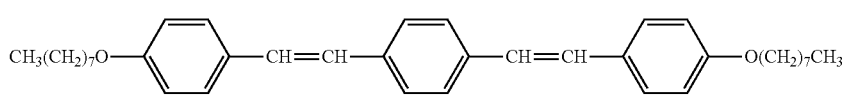

(3)

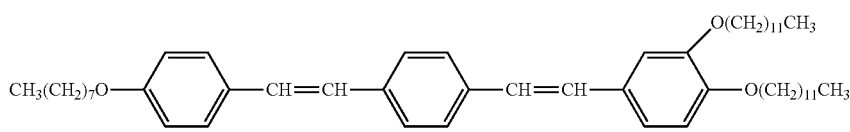

(4)

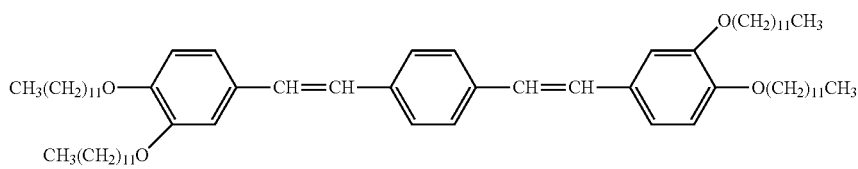

(5)

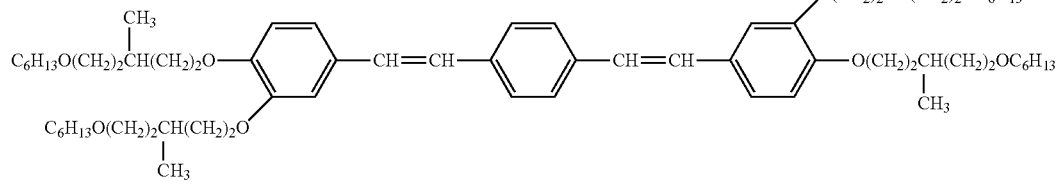

(6)

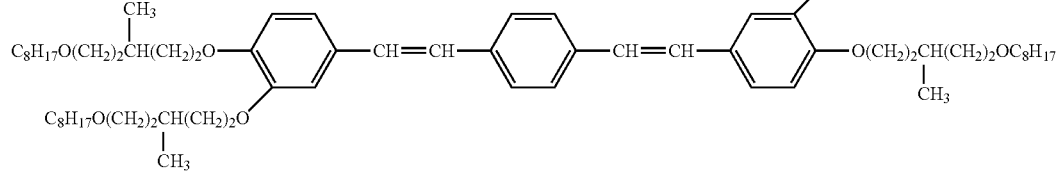

(7)

It is preferred that the dicyclic liquid crystal compound represented by the formula (1) is, for example, at least one member of compounds represented by the following formulae (8) to (10).

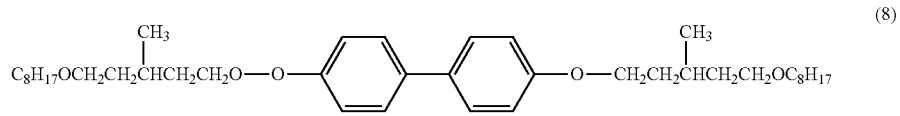

(8)

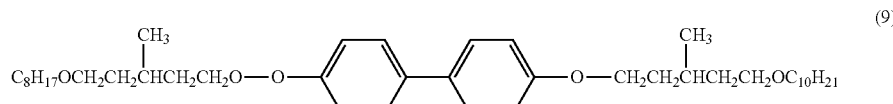

(9)

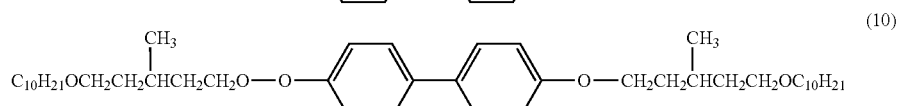

(10)

In the present embodiment, with respect to the tricyclic liquid crystal compound represented by the formula (2), a single compound may be individually used, or two or more compounds may be used in combination. For example, the compounds represented by the formulae (3) to (7) above may be used individually or in combination. Further, all the compounds represented by the formulae (3) to (7) above may be used in combination.

In the present embodiment, with respect to the dicyclic liquid crystal compound represented by the formula (1), a single compound may be individually used, or two or more compounds may be used in combination. For example, the compounds represented by the formulae (8) to (10) above may be used individually or in combination. Further, all the compounds represented by the formulae (8) to (10) above may be used in combination.

With respect to the method for producing the dicyclic liquid crystal compound represented by the formula (1) and the tricyclic liquid crystal compound represented by the formula (2), there is no particular limitation, and the compounds can be produced using known reactions in combination. For example, the compounds can be produced in accordance with the method described in Japanese Unexamined Patent Publication No. 2017-105874.

An example of the method for producing the tricyclic liquid crystal compound represented by the formula (2) is as follows.

There can be used a method in which an alcohol compound (for example, $R_{11}$—OH) or a phenolic compound (for example, HO—[tricyclic skeletal structure]—OH) is reacted with a halogen compound (for example, $R^{11}$—X or X—[tricyclic skeletal structure]—X (wherein X is a halogen atom, such as a chlorine atom, a bromine atom, or an iodine atom)) using an alkali metal or an alkali metal alcoholate. For example, the tricyclic liquid crystal compound can be prepared in accordance with the method described in Japanese Patent No. 5916916.

Particularly, the tricyclic liquid crystal compound represented by the formula (2) can be prepared as shown below.

At least one compound represented by the following formula:

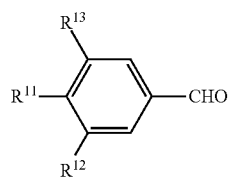

wherein $R^{11}$ is a group: —OR or a group: —OCH$_2$CH$_2$CH(R')CH$_2$CH$_2$OR (wherein R is linear or branched $C_nH_{2n+1}$ wherein the relationship: $1 \leq n \leq 20$ is satisfied, and R' is methyl or ethyl), and $R^{12}$ and $R^{13}$ are the same or different, and are hydrogen, a group: —OR, or a group: —OCH$_2$CH$_2$CH(R')CH$_2$CH$_2$OR (wherein R is linear or branched $C_nH_{2n+1}$ wherein the relationship: $1 \leq n \leq 20$ is satisfied, and R' is methyl or ethyl), at least one compound represented by the following formula:

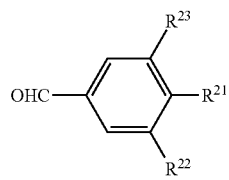

wherein $R^{21}$ is a group: —OR or a group: —OCH$_2$CH$_2$CH(R')CH$_2$CH$_2$OR (wherein R is linear or branched $C_nH_{2n+1}$ wherein the relationship: $1 \leq n \leq 20$ is satisfied, and R' is methyl or ethyl), and $R^{22}$ and $R^{23}$ are the same or different, and are hydrogen, a group: —OR, or a group: —OCH$_2$CH$_2$CH(R')CH$_2$CH$_2$OR (wherein R is linear or branched $C_nH_{2n+1}$ wherein the relationship: $1 \leq n \leq 20$ is satisfied, and R' is methyl or ethyl), and a compound represented by the following formula:

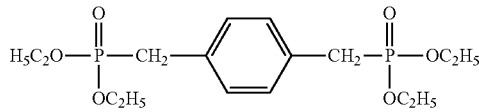

are subjected to reaction under appropriate reaction conditions to obtain a mixture of the compounds shown below:

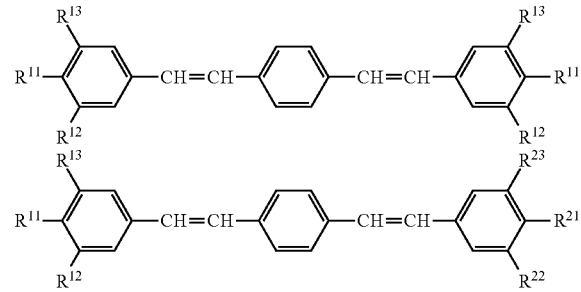

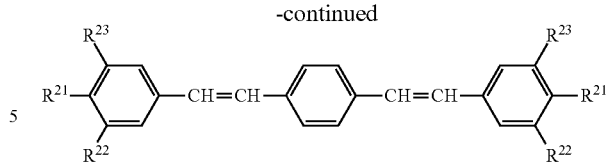

wherein $R^{11}$, $R^{12}$, $R^{13}$, $R^{21}$, $R^{22}$, and $R^{23}$ are as defined above in a molar ratio of 1:2:1.

Examples of the alkali metals include potassium carbonate, potassium hydroxide, sodium hydroxide and the like. Examples of the alkali metal alcoholates include sodium ethylate, sodium methylate, sodium tert-butoxide, potassium tert-butoxide and the like.

Further, in the above-mentioned reaction, conventionally known various organic solvents can be used, and, for example, diethyl ether, tetrahydrofuran (THF), acetone, or toluene can be used.

The tricyclic liquid crystal compound can be prepared by an alternative method as shown below.

At least one compound represented by the following formula:

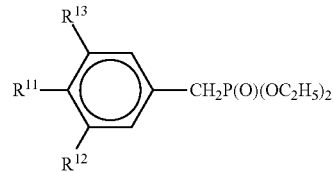

wherein $R^{11}$ is a group: —OR or a group: —OCH$_2$CH$_2$CH(R')CH$_2$CH$_2$OR (wherein R is linear or branched $C_nH_{2n+1}$ wherein the relationship: $1 \leq n \leq 20$ is satisfied, and R' is methyl or ethyl), and $R^{12}$ and $R^{13}$ are the same or different, and are hydrogen, a group: —OR, or a group: —OCH$_2$CH$_2$CH(R')CH$_2$CH$_2$OR (wherein R is linear or branched $C_nH_{2n+1}$ wherein the relationship: $1 \leq n \leq 20$ is satisfied, and R' is methyl or ethyl), at least one compound represented by the following formula:

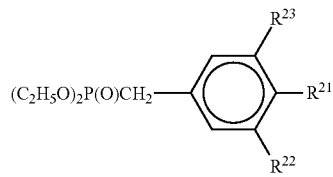

wherein $R^{21}$ is a group: —OR or a group: —OCH$_2$CH$_2$CH(R')CH$_2$CH$_2$OR (wherein R is linear or branched $C_nH_{2n+1}$ wherein the relationship: $1 \leq n \leq 20$ is satisfied, and R' is methyl or ethyl), and $R^{22}$ and $R^{23}$ are the same or different, and are hydrogen, a group: —OR, or a group: —OCH$_2$CH$_2$CH(R')CH$_2$CH$_2$OR (wherein R is linear or branched $C_nH_{2n+1}$ wherein the relationship: $1 \leq n \leq 20$ is satisfied, and R' is methyl or ethyl), and terephthalaldehyde represented by the following formula:

are subjected to reaction under appropriate reaction conditions to obtain a mixture of the compounds shown below:

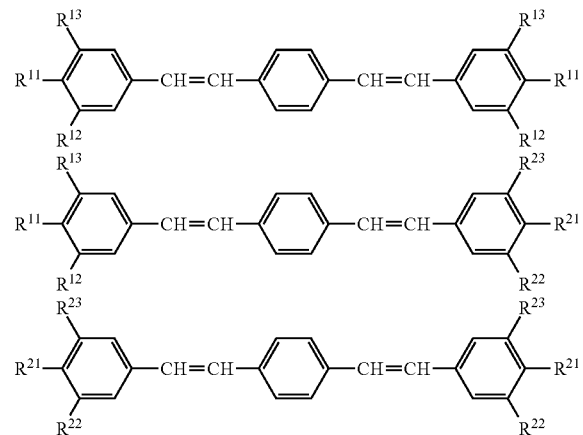

wherein $R^{11}$, $R^{12}$, $R^{13}$, $R^{21}$, $R^{22}$, and $R^{23}$ are as defined above in a molar ratio of 1:2:1.

The lubricant composition of the present embodiment is very unlikely to evaporate (for example, when placed in an atmosphere at a temperature of 100° C., the residual rate of the lubricant composition after a lapse of 600 hours is 95% or more), and therefore has an advantage in that, as compared to a general-purpose grease or the like, the lubricant composition can be continuously used for a long term without making up for it.

The lubricant composition of the present embodiment is very unlikely to evaporate in a high vacuum (for example, when placed in an atmosphere at a temperature of 25° C. under a pressure of $10^{-5}$ Pa, the residual rate of the lubricant composition after a lapse of 1,000 hours is 95% or more), and therefore can be advantageously used in a high vacuum, such as aerospace.

The lubricant composition of the present embodiment has extremely low dust generation property, and therefore can be advantageously used in, for example, a semiconductor producing apparatus installed in a clean room which is required to achieve high cleanness.

The lubricant composition of the present embodiment is unlikely to evaporate and has low dust generation property. Further, the lubricant composition of the present invention can stably exhibit performance in a high vacuum or at high temperatures. Therefore, the lubricant composition of the present invention can exhibit excellent performance as a lubricant for a bearing.

A bearing having sealed therein the lubricant composition of the present embodiment can be advantageously used in, for example, a semiconductor producing apparatus installed in a clean room. Further, the bearing having sealed therein the lubricant composition of the present invention can be advantageously used in a machine or an apparatus installed in a high vacuum, such as aerospace. Further, the bearing having sealed therein the lubricant composition of the present invention can be advantageously used in, for example, a precision machine, a wind turbine generator in which maintenance is difficult, an earthquake absorbing apparatus, and the like.

Further, specific examples of the bearing having sealed therein the lubricant composition of the present embodiment include a bearing used in automotive electric parts, such as an electric fan motor and a wiper motor, a rolling bearing used in automotive engine auxiliary machines, such as a water pump and an electromagnetic clutch apparatus, and a driving system, a rolling bearing used in a rotary apparatus, such as a small-size or large-size general-purpose motor for industrial machine apparatus, a high-speed high-precision rotating bearing, such as a main shaft bearing for machine tool, a rolling bearing used in an air-conditioner fan motor and a motor and a rotary apparatus for household appliances, such as a washing machine, a rolling bearing used in a rotating part for computer-related machines, such as an HDD apparatus and a DVD apparatus, a rolling bearing used in a rotating part for office automation machines, such as a copying machine, and automatic ticket gate, and an axle bearing for electric railcar and freight car.

The lubricant composition of the present embodiment has a characteristic feature such that it further contains halogen ions. Examples of halogen ions include fluoride ions ($F^-$), chloride ions ($Cl^-$), bromide ions ($Br^-$), and iodide ions ($I^-$). The lubricant composition of the present embodiment may contain one type of the above halogen ions or two or more types of the above halogen ions.

It is preferred that the lubricant composition of the present embodiment contains at least one type of ions among chloride ions ($Cl^-$) and bromide ions ($Br^-$). It is further preferred that the lubricant composition of the present embodiment contains chloride ions ($Cl^-$).

The content of the halogen ions in the lubricant composition of the present embodiment is 1 to 900 ppm. The content of the halogen ions is preferably 3 to 900 ppm, more preferably 5 to 900 ppm. The reason why the content of the halogen ions in the lubricant composition is specified in the above-mentioned range is described below.

For example, it has been known that chloride ions ($Cl^-$) which are one type of halogen ions promote corrosion of a metal, such as iron. Therefore, with respect to the lubricant composition used for a contact area of metal parts, it has been considered that the amount of halogen ions, such as chloride ions, contained in the lubricant composition is preferably as small as possible.

However, the present inventors have found that, with respect to the lubricant composition comprising the dicyclic liquid crystal compound represented by the formula (1) above and the tricyclic liquid crystal compound represented by the formula (2) above, when the lubricant composition contains no halogen ion (halogen ion concentration=0 ppm), excellent results cannot be obtained in the below-mentioned durability test.

Further, it has unexpectedly been found that when the lubricant composition contains halogen ions in a certain amount, excellent results can be obtained in the below-mentioned durability test. On the other hand, with respect to the lubricant composition which contains halogen ions in a predetermined amount or less, it has been found that even when the lubricant composition is applied to a contact area of metal parts, generation of rust is satisfactorily suppressed. The present invention has been completed, based on the above novel finding.

Specifically, the content of the halogen ions in the lubricant composition of the present embodiment is 1 ppm or more. When the content of the halogen ions is less than 1 ppm, excellent results cannot be achieved in the below-mentioned durability test, and thus a lubricant composition which can exhibit excellent lubricating performance cannot be obtained. When the content of the halogen ions is 1 ppm or more, excellent results can be achieved in the below-mentioned durability test, and thus a lubricant composition which can exhibit excellent lubricating performance can be obtained. The content of the halogen ions in the lubricant composition of the present embodiment is preferably 3 ppm or more, more preferably 5 ppm or more.

The content of the halogen ions in the lubricant composition of the present embodiment is 900 ppm or less. When the content of the halogen ions is more than 900 ppm, it is likely that the lubricant composition which is applied to a contact area of metal parts cannot satisfactorily suppress generation of rust. The content of the halogen ions in the lubricant composition of the present embodiment is preferably 800 ppm or less, more preferably 700 ppm or less.

The content of the halogen ions in the lubricant composition of the present embodiment can be controlled by a known method. For example, the content of the halogen ions in the lubricant composition can be controlled by adding a salt containing a halogen element to the lubricant composition.

For example, for controlling the content of chloride ions ($Cl^-$), a salt containing a chlorine atom, such as potassium chloride (KCl) or sodium chloride (NaCl), is added to the lubricant composition. Thus, the content of the chloride ions in the lubricant composition can be controlled. A salt containing a chlorine atom (for example, potassium chloride) can be easily dispersed in the lubricant composition of the present embodiment, facilitating such control of the content of the chloride ions.

For example, for controlling the content of bromide ions ($Br^-$), a salt containing a bromine atom, such as potassium bromide (KBr) or sodium bromide (NaBr), is added to the lubricant composition. Thus, the content of the bromide ions in the lubricant composition can be controlled. A salt containing a bromine atom (for example, potassium bromide) can be easily dispersed in the lubricant composition of the present embodiment, facilitating such control of the content of the bromide ions.

Further, the lubricant composition of the present embodiment likely contains halogen ions derived from the raw materials. By subjecting the lubricant composition to step of washing with water or an alcohol, the halogen ions contained in the lubricant composition can be removed, and therefore the content of the halogen ions can be controlled to be in a desired range.

The content of the halogen ions in the lubricant composition of the present embodiment can be measured by a known method. For example, the content of the halogen ions can be measured by a combustion ion chromatography method.

The additional components which may be contained in the lubricant composition of the present embodiment are individually described below. These components are basically a material conventionally known as a constituent of a lubricant, and the amount of each component contained in the lubricant composition can be appropriately selected by those skilled in the art from a conventionally known range unless otherwise specified. Further, with respect to each of the components, a single material may be individually used, or two or more materials may be used in combination.

(Liquid Crystal Compound)

The compounds represented by the formulae (1) and (2) are liquid crystal compounds, and the lubricant composition of the present embodiment may contain a liquid crystal compound other than these liquid crystal compounds.

Examples of such liquid crystal compounds include a liquid crystal compound exhibiting a smectic phase or a nematic phase, an alkylsulfonic acid, a compound having a Nafion membrane structure, an alkylcarboxylic acid, an alkylsulfonic acid, and the like. Further, the lubricant composition of the present embodiment may contain the liquid crystal compound described in the specification of Japanese Patent No. 5916916 or Japanese Unexamined Patent Publication No. 2017-105874.

(Base Oil)

The lubricant composition of the present embodiment and a certain type of a conventionally known lubricant base oil may be used in combination.

With respect to the base oil, there is no particular limitation, but examples of the base oils include a mineral oil, a highly refined mineral oil, a synthetic hydrocarbon oil, a paraffin mineral oil, an alkyl diphenyl ether oil, an ester oil, a silicone oil, a naphthene mineral oil, and a fluorine oil, and the like.

(Other Additives)

As examples of other additives which may be added to the lubricant composition of the present embodiment, there can be mentioned various types of additives used in lubricants, such as a bearing oil, a gear oil, and a hydraulic oil, specifically, an extreme pressure agent, an orientation adsorber, an anti-wear agent, a friction modifier, an oil agent, an antioxidant, a viscosity index improver, a pour point depressant, a detergent-dispersant, a metal inactivating agent, a corrosion inhibitor, a rust preventive agent, an anti-foaming agent, a solid lubricant, and the like.

Examples of the extreme pressure agents include a chlorine type compound, a sulfur type compound, a phosphoric acid type compound, a hydroxycarboxylic acid derivative, and an organometallic extreme pressure agent. By adding an extreme pressure agent, the lubricant composition of the present embodiment is improved in wear resistance.

Examples of the orientation adsorbers include organosilane, organotitanium, and organoaluminum, such as various coupling agents including a silane coupling agent, a titanium coupling agent, and an aluminum coupling agent. By adding an orientation adsorber, the liquid crystal orientation of the liquid crystal compound contained in the lubricant composition of the present embodiment is strengthened, so that the film formed from the lubricant composition of the present embodiment can be increased in the thickness and strength.

The lubricant composition of the present embodiment can be prepared by mixing the compounds represented by the formulae (1) and (2) and other components by a conventionally known method. An example of the method for preparing the lubricant composition of the present embodiment is as follows.

The components constituting the lubricant composition are mixed by a general method and then, if necessary, subjected to, for example, roll milling, deaeration treatment, or filter treatment to obtain the lubricant composition of the present invention. Alternatively, the lubricant composition can be prepared by first mixing the oil components of the lubricant composition, and then adding and mixing additional components, such as an additive, and, if necessary, subjecting the resultant mixture to, for example, the above-mentioned deaeration treatment. For controlling the halogen ion concentration of the lubricant composition, a salt containing a halogen atom may be added to the lubricant composition. Alternatively, the halogen ions contained in the lubricant composition may be removed by washing with water or an alcohol.

EXAMPLES

Herein below, the present invention will be described in more detail with reference to the following Examples, which should not be construed as limiting the scope of the present invention.

[Provision of Liquid Crystal Compounds]

As a dicyclic liquid crystal compound, a mixture of compounds represented by the formulae (8) to (10) below was provided. The mixing ratio of the compounds represented by the formulae (8) to (10) is about 1:2:1 (molar ratio).

lubricant composition to control the content of chloride ions in the lubricant composition. Using the lubricant composition having the chloride ion concentration controlled, the below-described high-temperature durability test was conducted.

The lubricant composition was cooled to ordinary temperature (25° C.), and then stirred several times using a spatula, and sealed in a bearing. As a bearing, a small-size ball spline bearing having a shaft diameter of 4 mm ("LSAG4", manufactured by Nippon Thompson Co., Ltd.) was used.

The ball spline bearing is, for example, small-size ball spline bearing 10 having outer cylinder 16 capable of linearly moving along shaft 14 through a plurality of rolling elements 12 as shown in FIG. 1. In the outer surface of shaft 14, raceway groove 14*a* in which rolling elements 12 roll is formed in the direction of the shaft. Rolling elements 12 are

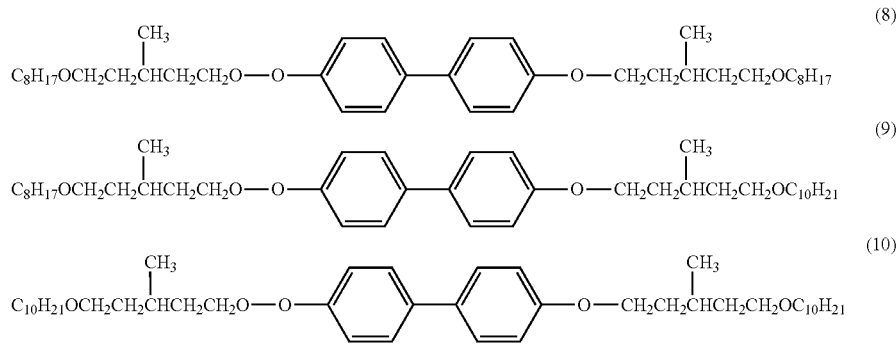

As a tricyclic liquid crystal compound, a mixture of compounds represented by the formulae (3) to (5) below was provided. The mixing ratio of the compounds represented by the formulae (3) to (5) is about 1:2:1 (molar ratio).

held between raceway groove 14*a* formed in the outer surface of shaft 14 and the inner surface of outer cylinder 16. End cap 18 for changing the direction of rolling elements 12 is fixed at the end of outer cylinder 16 by, for example,

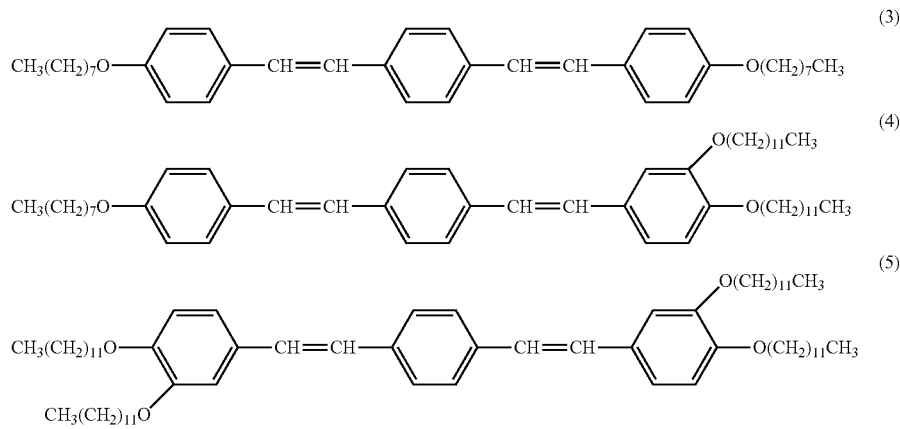

[High-Temperature Durability Test]

The above-provided dicyclic liquid crystal compound and tricyclic liquid crystal compound were heated to 200° C. and mixed to prepare samples 1 to 5 shown in Table 1 below, which are lubricant compositions. With respect to each sample, the [dicyclic liquid crystal compound:tricyclic liquid crystal compound] ratio (mass ratio) is 6:4 for sample 1, 8:2 for sample 2, 7:3 for sample 3, 6:4 for sample 4, and 4:6 for sample 5. Then, potassium chloride was added to the screwing. Rolling elements 12 which roll along raceway groove 14*a* are changed in direction by the direction changing passageway formed in end cap 18 so that they undergo infinite circulation.

For sealing the lubricant composition in bearing 10, shaft 14 was withdrawn from outer cylinder 16, and then the lubricant composition was applied in a predetermined amount to a plurality of rolling elements 12 held inside of outer cylinder 16. After applying the lubricant composition to rolling elements 12, as shown in FIG. 1, outer cylinder 16 was incorporated again into shaft 14.

The lubricant composition was sealed in bearing 10, and then a test of allowing shaft 14 to undergo continuous reciprocating movement in the state of fixing outer cylinder 16 while heating it was conducted. When the vibration value of bearing 10 during the test exceeded the set value, or at a time when abnormal generation of wear powder was confirmed, the test was stopped, and a running distance at the time was measured. The other conditions for the test are as shown below. The results of the high-temperature durability test are shown in Table 1 below.

(Conditions for Test)
Heating temperature for the outer cylinder: 80° C.
Load: Medium pilot pressure
Stroke: 50 mm
Maximum speed: 1 m/s
Amount of the sealed lubricant composition: 3 mg

TABLE 1

| Sample | Chloride ion concentration (ppm) | Running distance (km) |
| --- | --- | --- |
| 1 | 40000 | 1500 |
| 2 | 4.43 | 694 |
| 3 | 4.06 | 347 |
| 4 | 3.68 | 251 |
| 5 | 2.93 | 112 |

From the test results shown in Table 1, it has been found that when the concentration of the halogen ions (chloride ions) in the lubricant composition is 1 ppm or more, the running distance (durability distance) of the shaft is satisfactorily long, and the lubricant composition can stably exhibit lubricating performance for a long term. Further, it has been found that, as the concentration of the halogen ions (chloride ions) becomes higher, the running distance (durability distance) of the shaft is likely to be longer.

[Humidity Cabinet Test]

The above-provided dicyclic liquid crystal compound and tricyclic liquid crystal compound were heated to 200° C. and mixed in a 6:4 ratio (mass ratio) to prepare a lubricant composition. Then, potassium chloride was added to the lubricant composition to control the content of chloride ions in the lubricant composition. Using the lubricant composition having the chloride ion concentration controlled, the below-described humidity cabinet test was conducted.

Using a thermo-hygrostat testing machine, in accordance with the procedure described in JIS K 2246, a test for checking whether or not rust is generated on a test specimen having the lubricant composition applied thereto was conducted. Specifically, a test specimen was suspended in a testing machine (humid box) at an inner temperature of 50° C. and at a relative humidity of 95%, and the test was conducted until 160 hours lapsed, and the resultant specimen was visually checked in respect of the generation of rust. As a test specimen, martensite type stainless steel was used. The results of the humidity cabinet test are shown in Table 2 below.

TABLE 2

| Chloride ion concentration (ppm) | Generation of rust (o: No rust; x: Rust generated) |
| --- | --- |
| 40000 | x |
| 10000 | x |
| 5000 | x |
| 1000 | o |
| 500 | o |
| 100 | o |

From the test results shown in Table 2, it has been found that when the concentration of the halogen ions (chloride ions) in the lubricant composition is 900 ppm or less, generation of rust can be satisfactorily suppressed. Further, the results can confirm that, as the concentration of the halogen ions (chloride ions) becomes lower, generation of rust can be more likely suppressed.

[Oil Film State Checking Test]

The above-provided dicyclic liquid crystal compound and tricyclic liquid crystal compound were heated to 200° C. and mixed in a 6:4 ratio (mass ratio) to prepare a lubricant composition. Then, potassium chloride was added to the lubricant composition to control the content of chloride ions in the lubricant composition. Using the lubricant composition having the chloride ion concentration controlled, the below-described oil film state checking test was conducted.

The lubricant composition was sealed in bearing 10 shown in FIG. 1, and then an operation of allowing shaft 14 to undergo continuous reciprocating movement in the state of fixing outer cylinder 16 was conducted. A test for checking the state of the oil film (film of the lubricant composition) inside the bearing during the operation (on the strokes) was conducted. Conditions for the test are as follows.

(Conditions for Test)
Load: Medium pilot pressure
Stroke: 50 mm
Maximum speed: 1 m/s
Amount of the sealed lubricant composition: 3 mg The principle of the test is described. When a load is applied to the bearing in the static state, metal contact is made between the outer cylinder raceway and the shaft raceway through the rolling elements (balls), and therefore the electrical resistance between them is nearly 0Ω. A film of the lubricant composition (oil film) is formed on the raceway and rolling elements during the operation (on the strokes), and therefore the electrical resistance between the outer cylinder raceway and the shaft raceway is increased. The present inventors have confirmed that an oil film is not formed immediately after the start of running, but, as the running distance is increased, an oil film is formed. From the electrical resistance value between the shaft and the outer cylinder during the operation, the state of the oil film formed inside the bearing can be expected. In the actual measurement, the current value was kept constant, and a value of electrical resistance was measured from a value of voltage.

Figure 2:
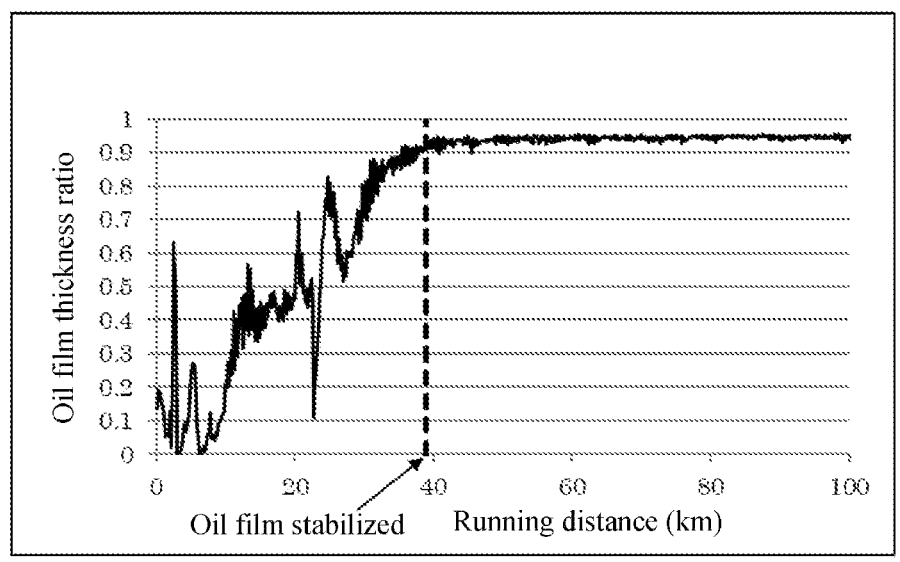
FIG. 2 A graph showing the results of the oil film state checking test conducted for the case where the chloride ion concentration is high.

The graph of FIG. 2 shows the results of the test conducted for the case where the lubricant composition having a chloride ion concentration of 40,000 ppm was sealed in the bearing. In FIG. 2, the "Oil film thickness ratio" seen at the ordinate indicates an electrical resistance determined when the maximum resistance value is taken as 1. As can be seen from FIG. 2, when the chloride ion concentration is high, the electrical resistance value is almost constant at a time when the running distance exceeds about 40 km, which indicates that the running distance required until a film of the lubricant composition is stably formed is short.

Figure 3:
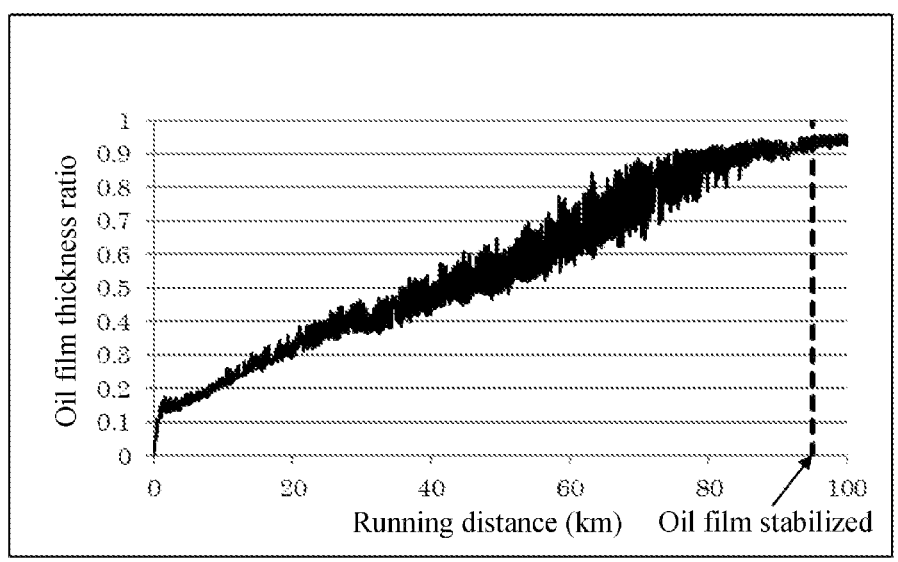
FIG. 3 A graph showing the results of the oil film state checking test conducted for the case where the chloride ion concentration is low.

The graph of FIG. 3 shows the results of the test conducted for the case where the lubricant composition having a chloride ion concentration of 3.68 ppm was sealed in the bearing. In FIG. 3, the "Oil film thickness ratio" seen at the ordinate indicates an electrical resistance determined when the maximum resistance value is taken as 1. As can be seen from FIG. 3, when the chloride ion concentration is low, the electrical resistance value is almost constant at a time when the running distance exceeds about 95 km, which indicates that the running distance required until a film of the lubricant composition is stably formed is long.

From the results shown in FIGS. 2 and 3, it is apparent that, as the concentration of the halogen ions (chloride ions) in the lubricant composition becomes higher, the running distance required until a film of the lubricant composition (oil film) is stably formed is reduced.

In the above-mentioned high-temperature durability test, results were obtained such that, as the concentration of the halogen ions (chloride ions) in the lubricant composition became higher, the running distance (durability distance) of the shaft was increased. The reason that such results were obtained is presumed that, as the concentration of the halogen ions (chloride ions) in the lubricant composition becomes higher, a film of the lubricant composition (oil film) is formed in a short time. That is, it is presumed that when an oil film is formed in a short time, lubrication between the shaft and the outer cylinder is sooner started and wear is suppressed by the oil film, so that the running distance (durability distance) of the shaft is increased.

The reason that as the concentration of the halogen ions (chloride ions) in the lubricant composition became higher, the running distance required until a film of the lubricant composition (oil film) is formed was reduced is presumed as follows.

Specifically, it is presumed that, as the concentration of the halogen ions (chloride ions) becomes higher, the halogen ions cause a certain film, such as a passive film, to be formed on the surface of the shaft or outer cylinder, so that the formed film promotes formation of an oil film. With respect to the result that the running distance (durability distance) of the shaft is increased, another factor is presumed that the halogen ions (chloride ions) cause an oxide film to be formed on the surface of the shaft or outer cylinder, so that wear is suppressed by the oxide film. However, the present invention is not limited by the above-mentioned theoretical presumption.

DESCRIPTION OF REFERENCE NUMERALS

10: Bearing
12: Rolling element
14: Shaft
16: Outer cylinder
18: End cap

The invention claimed is:

1. A lubricant composition comprising at least one dicyclic liquid crystal compound represented by the following formula (1), at least one tricyclic liquid crystal compound represented by the following formula (2), and halogen ions, wherein the content of the halogen ions in the lubricant composition is 4.43 to 900 ppm:

formula (1):

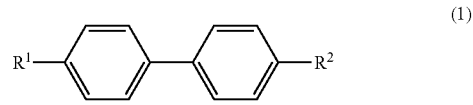

wherein $R^1$ and $R^2$ are the same or different, and are a group: —OCH$_2$CH$_2$CH(R')CH$_2$CH$_2$OR (wherein R is linear or branched $C_nH_{2n+1}$ wherein the relationship: $1 \leq n \leq 20$ is satisfied, and R' is methyl or ethyl), formula (2):

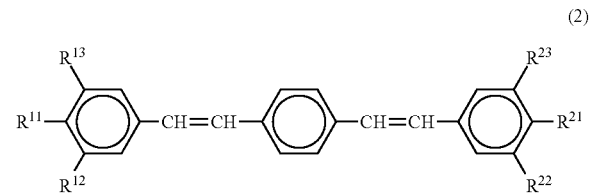

wherein $R^{11}$ and $R^{21}$ are the same or different, and are a group: —OR or a group: —OCH$_2$CH$_2$CH(R')CH$_2$CH$_2$OR (wherein R is linear or branched $C_nH_{2n+1}$ wherein the relationship: $1 \leq n \leq 20$ is satisfied, and R' is methyl or ethyl), and $R^{12}$, $R^{13}$, $R^{22}$, and $R^{23}$ are the same or different, and are hydrogen, a group: —OR, or a group: —OCH$_2$CH$_2$CH(R')CH$_2$CH$_2$OR (wherein R is linear or branched $C_nH_{2n+1}$ wherein the relationship: $1 \leq n \leq 20$ is satisfied, and R' is methyl or ethyl), wherein the halogen ions are at least one type selected from the group consisting of chloride ions and bromide ions, and wherein a mass ratio of the dicyclic liquid crystal compound to tricyclic liquid crystal compound ([the dicyclic liquid crystal compound]:[the tricyclic liquid crystal compound]) is 4:6 to 8:2.

2. The lubricant composition according to claim 1, wherein the halogen ions are chloride ions.

3. The lubricant composition according to claim 1, wherein the tricyclic liquid crystal compound is at least one member of compounds represented by the following formulae (3) to (7):

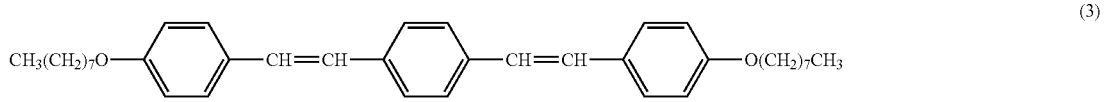

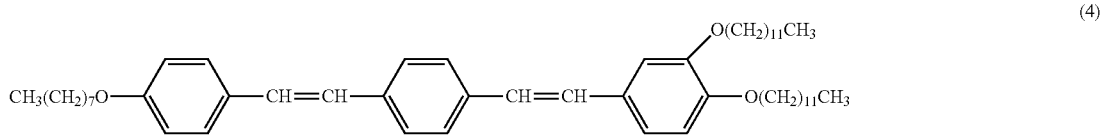

-continued

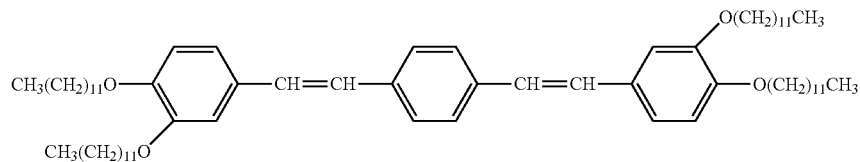

(5)

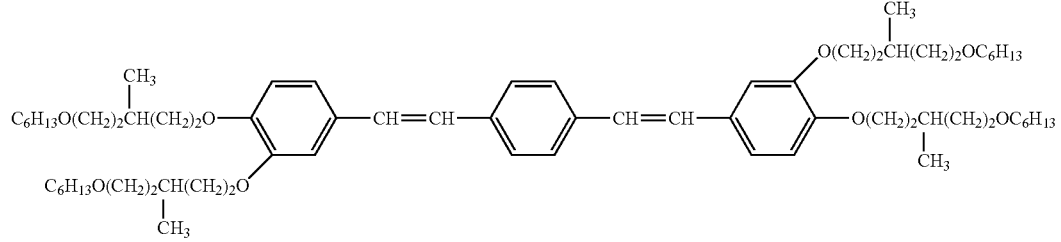

(6)

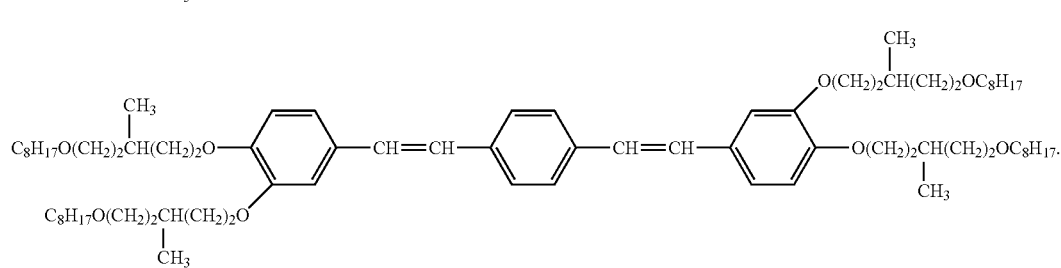

(7)

4. A bearing having sealed therein the lubricant composition according to claim 1.

5. A bearing having sealed therein the lubricant composition according to claim 2.

6. A bearing having sealed therein the lubricant composition according to claim 3.

7. The lubricant composition according to claim 1, wherein the content of the halogen ions in the lubricant composition is 100 to 900 ppm.

8. A bearing having sealed therein the lubricant composition according to claim 7.

* * * * *